US012807493B2

(12) United States Patent
Yang et al.

(10) Patent No.: US 12,807,493 B2
(45) Date of Patent: Nov. 24, 2026

(54) LITHIUM IRON PHOSPHATE POSITIVE ELECTRODE MATERIAL HAVING A HIGH TAP DENSITY, METHOD FOR PREPARING THE SAME

(71) Applicant: HUBEI WANRUN NEW ENERGY TECHNOLOGY CO., LTD., Shiyan City (CN)

(72) Inventors: Jiaojiao Yang, Shiyan City (CN); Qin Wang, Shiyan City (CN); Xu Zhao, Shiyan City (CN)

(73) Assignee: HUBEI WANRUN NEW ENERGY TECHNOLOGY CO., LTD., Shiyan City (CN)

( * ) Notice: Subject to any disclaimer, the term of this patent is extended or adjusted under 35 U.S.C. 154(b) by 642 days.

(21) Appl. No.: 18/260,860

(22) PCT Filed: Dec. 9, 2022

(86) PCT No.: PCT/CN2022/137777

§ 371 (c)(1),
(2) Date: Jul. 10, 2023

(87) PCT Pub. No.: WO2023/226372

PCT Pub. Date: Nov. 30, 2023

(65) Prior Publication Data

US 2024/0391776 A1 Nov. 28, 2024

(30) Foreign Application Priority Data

May 27, 2022 (CN) ........................ 202210592764.9

(51) Int. Cl.

*C01B 25/45* (2006.01)
*H01M 4/02* (2006.01)
(Continued)

(52) U.S. Cl.

CPC ........... *C01B 25/45* (2013.01); *H01M 4/5825* (2013.01); *H01M 10/0525* (2013.01);
(Continued)

(58) Field of Classification Search

CPC .. H01M 4/5825; H01M 10/0525; C01B 25/45
See application file for complete search history.

(56) References Cited

U.S. PATENT DOCUMENTS

2009/0148765 A1 6/2009 Cao et al.
2024/0105937 A1* 3/2024 Yang .................. H01M 4/5825

FOREIGN PATENT DOCUMENTS

CN 106992297 A * 7/2017 ............ H01M 4/525
CN 107565111 A * 1/2018 ............. B82Y 30/00
(Continued)

OTHER PUBLICATIONS

Chunxia et al., "Effect of different ball-milling time on the preparation of LiFePO4/C", New Chemical Materials, vol. 41, No. 12, 3 pages.

(Continued)

*Primary Examiner* — Karie O'Neill Apicella
(74) *Attorney, Agent, or Firm* — The Sun IP Law

(57) ABSTRACT

The present disclosure provides a lithium iron phosphate positive electrode material having a high tap density, a method for preparing the same and applications thereof. The method comprises: grinding and spraying in sequence a mixed solution of an iron source, a lithium source, a carbon source and an ion doping agent to obtain a precursor powder; and sintering the precursor powder at a high temperature to obtain the lithium iron phosphate positive electrode material. The method has a simple and controllable process and high productivity. The lithium iron phosphate positive electrode material has excellent characteristics such as a high tap density, and a high specific capacity; and due to its unique
(Continued)

morphology, the material may be used by being blended with a ternary material, so that the lithium iron phosphate battery prepared has safety while having the characteristics of ternary batteries such as a high energy density and low temperature resistance.

10 Claims, 4 Drawing Sheets

(51) Int. Cl.
*H01M 4/58* (2010.01)
*H01M 10/0525* (2010.01)

(52) U.S. Cl.
CPC ...... *C01P 2004/32* (2013.01); *C01P 2004/50* (2013.01); *C01P 2004/61* (2013.01); *C01P 2006/11* (2013.01); *C01P 2006/40* (2013.01); *H01M 2004/028* (2013.01)

(56) References Cited

FOREIGN PATENT DOCUMENTS

| | | | | | |
|---|---|---|---|---|---|
| CN | 108706564 A | | 10/2018 | | |
| CN | 109192953 A | | 1/2019 | | |
| CN | 113929070 A | * | 1/2022 | ............ | C01B 25/45 |
| CN | 113929073 A | | 1/2022 | | |
| CN | 113991112 A | | 1/2022 | | |
| CN | 114335478 A | * | 4/2022 | ............. | H01M 4/36 |
| CN | 114804058 A | | 7/2022 | | |

OTHER PUBLICATIONS

International Search Report for PCT/CN2022/137777, mailed Feb. 22, 2023, 4 pages.
Written Opinion of the ISA for PCT/CN2022/137777, mailed Feb. 22, 2023, 4 pages.
Office Action for CN202210592764.9, dated Nov. 30, 2022, 5 pages.
Second Office Action mailed Feb. 1, 2023 in Chinese Application No. 202210592764.9, with English translation, 23 pages.
Decision of Rejection mailed Apr. 1, 2023 in Chinese Application No. 202210592764.9, with English translation, 15 pages.

* cited by examiner

LITHIUM IRON PHOSPHATE POSITIVE ELECTRODE MATERIAL HAVING A HIGH TAP DENSITY, METHOD FOR PREPARING THE SAME

This application is the U.S. national phase of International Application No. PCT/CN2022/137777 filed Dec. 9, 2022 which designated the U.S. and claims the priority of Chinese invention patent application No. 202210592764.9 filed on May 27, 2022, entitled "Lithium iron phosphate positive electrode material having high tap density, method for preparing the same and application thereof", the entire contents of each of which are hereby incorporated by reference.

TECHNICAL FIELD

The present disclosure relates to the technical field of lithium ion batteries, in particular to a lithium iron phosphate positive electrode material having a high tap density, a method for preparing the same and applications thereof.

BACKGROUND

Lithium-ion batteries are widely used as secondary rechargeable batteries in various aspects of life due to their advantages such as a high energy density, good safety performance, a long charge-discharge cycle life, and low self-discharge. Previously, lithium-ion batteries have been a core research project and an important research direction in the field of power energy. With the development of new energy technology, lithium-ion batteries have been greatly improved in various aspects of performances such as safety and cycle life, and thus have become the preferable power batteries and energy storage batteries. Lithium iron phosphate ($LiFePO_4$) soon became a very important positive electrode material for lithium batteries due to their advantages such as high safety, a long cycle life and low costs, and lithium-ion batteries using $LiFePO_4$ as the positive electrode material have been applied to many areas such as portable electronic devices, automobiles, ships and energy storage. With the rapid development of China's new energy vehicle industry, the demands for lithium-ion power batteries are improved increasingly. Since 2020, the proportion of the installation of $LiFePO_4$ power batteries has gradually increased, especially in passenger vehicles, resulting in a tendency of rapid growth of $LiFePO_4$ positive electrode material in the market.

The tap density refers to the mass per unit volume of powder in a container as measured after the powder is tapped under specified conditions. In general, the larger the tap density, the higher the capacity of the battery can be. Therefore, the tap density is regarded as one of the reference indicators for the energy density of the material. With certain process conditions for producing batteries, the larger the tap density, the higher the capacity of the batteries. With the present rapid rise of new energy vehicles, there is a need to further increase the tap density of lithium iron phosphate to meet the requirements of the market so that lithium iron phosphate may be widely used in new energy electric vehicles and hybrid electric vehicles. At present, the lithium iron phosphate in the industry generally has a tap density of 0.8 g/cm$^3$-1.2 g/cm$^3$. Accordingly, it is an urgent problem to improve the tap density of the lithium iron phosphate material while ensuring its electrical properties, thereby increasing the volume specific capacity of the material, for the purpose of the large-scale commercial application of the material.

In view of this, the present disclosure is proposed.

SUMMARY

The first object of the present disclosure is to provide a method for preparing a lithium iron phosphate positive electrode material having a high tap density, in which a lithium iron phosphate positive electrode material having a high tap density and a high specific capacity is prepared by using anhydrous ferric phosphate having a high tap density and controlling the key parameters of the processes of grinding, spraying, and sintering.

The second object of the present disclosure is to provide a lithium iron phosphate positive electrode material prepared by the method for preparing the lithium iron phosphate positive electrode material having a high tap density. The positive electrode active material prepared by the present disclosure has a unique morphology, and has a spherical shape of 3 μm to 10 μm which is formed by the aggregation of small particles of 200 nm to 300 nm, and its D50, D90, and Dmax are similar to those of conventional ternary materials, so it may be used alone or by being mixed with a ternary material at a ratio for lithium iron phosphate power batteries.

The third object of the present disclosure is to provide a ternary material-lithium iron phosphate mixed positive electrode material. This mixed positive electrode active material may not only ensure the safety of the lithium iron phosphate battery, but also have the characteristics of ternary batteries such as a high energy density and low temperature resistance, and thus have good application prospects.

The fourth object of the present disclosure is to provide a lithium ion battery comprising a positive electrode, a negative electrode, a separator and an electrolyte.

In order to achieve the above objects of the present disclosure, the following technical scheme is proposed:

a method for preparing a lithium iron phosphate positive electrode material having a high tap density, comprising:

grinding and spraying in sequence a mixed solution of an iron source, a lithium source, a carbon source and an ion doping agent to obtain a precursor powder; and sintering the precursor powder at a high temperature to obtain the lithium iron phosphate positive electrode material having a high tap density.

Preferably, the lithium iron phosphate positive electrode material has a spherical shape formed by aggregation of particles having a particle size of 200 nm to 300 nm, and the lithium iron phosphate has a diameter of 3 μm to 10 μm.

Preferably, a molar ratio of the iron source to the lithium source is 1:1-1.1.

More preferably, a molar ratio of the iron source to the lithium source is 1:1-1.05.

Preferably, the mixed solution has a solid content of 30% to 50%.

Preferably, the carbon source has a content of 1 wt % to 2 wt %.

Preferably, the ion dopant has a concentration of 1000 ppm to 3000 ppm.

Preferably, the iron source comprises anhydrous ferric phosphate; and more preferably, the anhydrous ferric phosphate has a tap density of 1.2 g/cm$^3$ to 1.4 g/cm$^3$, a BET of 4 m$^2$/g to 6 m$^2$/g, and a flaky microscopic morphology.

Commercially available industrial grade anhydrous ferric phosphate has a tap density of about 0.6 g/$cm^3$ to 0.8 g/$cm^3$, while battery-grade anhydrous ferric phosphate generally has a tap density of more than 0.85 g/$cm^3$, or from 0.8 g/$cm^3$ to 1.6 g/$cm^3$ depending on the price and the quality distribution. The tap density in accordance with the limitations of the present disclosure may be achieved by conventional pretreatment methods, and is measured according to GB/T 14260. It should be noted that it's not always better for the anhydrous ferric phosphate in the present disclosure to have a larger tap density, for example, Chinese patent publication No. CN201910313468.9 discloses an anhydrous ferric phosphate which has a tap density of 1.87 g/$cm^3$ to 1.92 g/$cm^3$, however, firstly, the preparation of such anhydrous ferric phosphate is dependent on a particular method which involves very limited purchase channels or price cost, and secondly, the desirable morphological characteristics in the present disclosure cannot be obtained when the tap density of anhydrous ferric phosphate is too large, thus limiting its applications, and accordingly, when the anhydrous ferric phosphate is mixed with a ternary material, a lithium ion positive electrode that is stable and has good performances cannot be obtained.

Preferably, the ion dopant comprises at least one of titanium dioxide, magnesium oxide, magnesium hydroxide, zinc oxide, zirconium dioxide, vanadium pentoxide and ammonium metavanadate;

The titanium dioxide may be selected from chemically pure nano titanium dioxide, and titanium white powder, the main component of which is titanium dioxide;

In the present disclosure, with the addition of a metal ion dopant in the positive electrode material, not only the conductivity of the lithium iron phosphate is improved, but also the primary crystal particles of the lithium iron phosphate are refined, such that the single crystal particle has a particle size ranging from 200 nm to 300 nm, ensuring that the lithium iron phosphate has both good electrical properties and a unique particle morphology.

Preferably, the lithium source comprises at least one of lithium carbonate, lithium hydroxide, lithium nitrate and lithium oxalate; and the carbon source comprises at least one of glucose, polyethylene glycol, trimesic acid, white granulated sugar, citric acid, sucrose, activated carbon, carbon nanotubes and graphene.

Preferably, the grinding may be carried out using conventional wet grinding equipment, more preferably, the grinding is sand grinding.

Preferably, a mixture obtained from the grinding has a median particle diameter (D50) of ≤0.5 μm; and more preferably, those skilled in the art may select suitable parameters such as the grinding device, the motor power, the specifications of the grinding medium, and the period of time for grinding according to this median particle diameter.

Preferably, the spraying is carried out using a spraying device at a gas source pressure of 0.3 MPa to 0.6 MPa and a peristaltic pump at a feeding frequency of 15 Hz to 30 Hz.

More preferably, the spraying is carried out at an inlet air temperature of 240° C. to 300° C. and an exhaust air temperature of 100° C. to 110° C.

Preferably, the above parameters of the spraying are set to reach a median particle diameter (D50) between 3 μm and 10 μm.

Preferably, the sintering is carried out at a high temperature of 730° C. to 770° C. for 15 hours to 20 hours.

More preferably, the sintering is carried out under a protective atmosphere.

A lithium iron phosphate positive electrode material prepared by the above method for preparing a lithium iron phosphate positive electrode material having a high tap density.

A ternary material-lithium iron phosphate mixed positive electrode material, comprising a ternary material, the above lithium iron phosphate positive electrode material and a binder.

A mass ratio of the ternary material to the lithium iron phosphate positive electrode material is 0.5-1:1.

The ternary material is lithium nickel cobalt manganese oxide $Li(Ni_xCo_yMn_z)O_2$. Since conventional ternary materials and the lithium iron phosphate positive electrode material prepared by the present disclosure have similar particle sizes, a D50 of 3 μm to 10 μm, and a D90≤20 μm, the two materials are highly compatible when being blended to prepare the mixed positive electrode material, and it is shown in experiments that the safety performance of the mixed positive electrode material may be further improved while maintaining the advantages of ternary materials such as a high capacity and low temperature resistance.

Preferably, the binder comprises at least one of polyvinylidene fluoride (PVDF), polyvinylpyrrolidone (PVP), polytetrafluoroethylene (PTFE), polyacrylic acid (PAA), polyacrylonitrile (PAN), polyacrylate, and styrene-butadiene rubber (SBR);

More preferably, a content of the binder in the mixed positive electrode material is 0.5% to 2%.

Preferably, a small amount of the carbon source may also be adaptively added to the mixed positive electrode material as a conductive agent.

A lithium ion battery, comprising: a positive electrode made of the above lithium iron phosphate positive electrode material or the above ternary material-lithium iron phosphate mixed positive electrode material, a negative electrode, a separator and an electrolyte.

Preferably, a method for preparing the positive electrode comprises: preparing a positive electrode slurry by dispersing positive electrode components in a solvent uniformly, coating the positive electrode slurry on a current collector uniformly, and performing rolling, sheeting, heat treatment or other conventional surface treatments to obtain the positive electrode.

Preferably, the current collector is an aluminum foil or an aluminum alloy foil.

Preferably, each of the negative electrode, the separator and the electrolyte may be conventional in the field without limitations.

The present disclosure has the following beneficial effects as compared to the prior art.

(1) In the present disclosure, a spherical lithium iron phosphate positive electrode material having a high tap density may be prepared by adding a metal ion dopant to an anhydrous ferric phosphate having a defined tap density, and controlling the process parameters of grinding, spraying and sintering; where the lithium iron phosphate has a high density, a tap density of 1.45 g/$cm^3$ to 1.60 g/$cm^3$; the method according to the present disclosure avoids the step of screening the raw material by particle size or mixing and matching the particles in the prior art, does not require secondary sintering, has simple and controllable processes, and high production efficiency; and the lithium iron phosphate prepared by the method has a high tap density, a high degree of particle sphericity, a uniform particle size, good electrical properties, and is applicable to large-scale industrial production.

(2) The lithium iron phosphate positive electrode material prepared in the present disclosure has a unique morphology, and has a spherical shape of 3 μm to 10 μm formed by the aggregation of many single crystal particles of 200 nm to 300 nm; due to the small particle size of the single crystal particles, the diffusion path for the lithium ions is short, and thus the positive electrode material has good electrical properties and rate performance; meanwhile, the spherical positive electrode material has a high degree of sphericity and good fluidity, so that the lithium iron phosphate prepared has good fluidity and processability.

(3) The lithium iron phosphate positive electrode material prepared by the present disclosure has similar particle size parameters (D50, D90, and Dmax) with conventional ternary materials, so it may be used alone or by being blended with a ternary material at a certain ratio for lithium iron phosphate power batteries. When the lithium iron phosphate positive electrode material is used together with a ternary material, the positive electrode not only retains the advantages of the ternary material such as a high capacity and low temperature resistance, but also has better safety.

BRIEF DESCRIPTION OF THE DRAWINGS

In order to illustrate the specific embodiments of the present disclosure or the technical schemes in the prior art more clearly, the accompanying drawings that need to be used in the specific embodiments or description of the prior art will be introduced briefly below. Apparently, the accompanying drawings described below are some embodiments of the present disclosure, and those skilled in the art may obtain other drawings based on these drawings without any inventive work.

DETAILED DESCRIPTION

Figure 1:
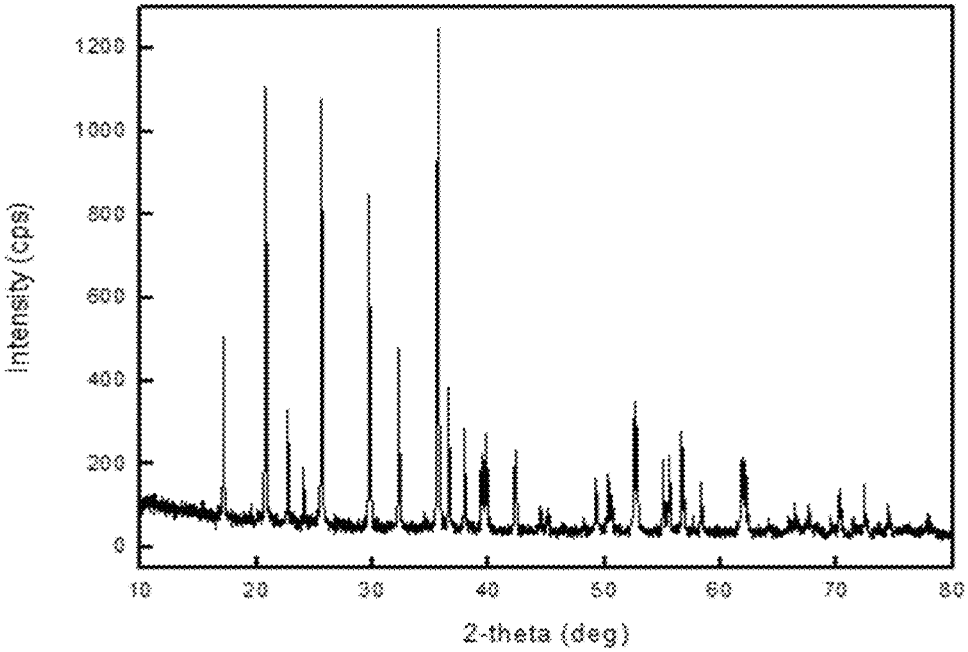
FIG. 1 is an XRD pattern of the lithium iron phosphate positive electrode material provided by Example 1 of the present disclosure.

The technical schemes of the present disclosure will be clearly and completely described below in conjunction with the accompanying drawings and specific embodiments, but those skilled in the art would understand that the embodiments described below are a part rather than all of the embodiments of the present disclosure, which are only used to illustrate the present disclosure and should not be construed as limiting the scope of the present disclosure. All the other embodiments obtained by those skilled in the art based on the embodiments of the present disclosure without making inventive efforts are within the protection scope of the present disclosure. The examples are carried out according to conventional conditions or the conditions suggested by the manufacturer if not specified. The reagents or instruments used in the examples, if not specified, are all commercially available conventional products.

The present disclosure is implemented as below.

A method for preparing a lithium iron phosphate positive electrode material having a high tap density, comprising:

grinding and spraying in sequence a mixed solution of an iron source, a lithium source, a carbon source and an ion doping agent to obtain a precursor powder; and sintering the precursor powder at a high temperature to obtain the lithium iron phosphate positive electrode material having a high tap density.

In a preferred embodiment, the lithium iron phosphate positive electrode material has a spherical shape formed by the aggregation of particles having a particle size of, but not limited to, 200 nm, 210 nm, 220 nm, 230 nm, 240 nm, 250 nm, 260 nm, 270 nm, 280 nm, 290 nm, or 300 nm; and the lithium iron phosphate has a diameter of, but not limited to, 3 μm, 4 μm, 5 μm, 6 μm, 7 μm, 8 μm, 9 μm, or 10 μm.

In a preferred embodiment, a molar ratio of the iron source to the lithium source is 1:1, 1:1.01, 1:1.02, 1:1.03, 1:1.04, 1:1.05, 1:1.06, 1:1.07, 1:1.08, 1:1.09, or 1:1.1.

In a preferred embodiment, the mixed solution has a solid content of, but not limited to, 30%, 32%, 34%, 35%, 36%, 38%, 40%, 42%, 44%, 45%, 46%, 48%, or 50%.

In a preferred embodiment, the carbon source has a content of, but not limited to 1 wt %, 1.1 wt %, 1.2 wt %, 1.3 wt %, 1.4 wt %, 1.5 wt %, 1.6 wt %, 1.7 wt %, 1.8 wt %, 1.9 wt %, or 2 wt %.

In a preferred embodiment, the ion dopant has a concentration of, but not limited to, 1000 ppm, 1200 ppm, 1400 ppm, 1600 ppm, 1800 ppm, 2000 ppm, 2200 ppm, 2400 ppm, 2600 ppm, 2800 ppm, or 3000 ppm.

In a preferred embodiment, the iron source is anhydrous ferric phosphate, and the anhydrous ferric phosphate has a tap density of, but not limited to, 1.2 $g/cm^3$, 1.22 $g/cm^3$, 1.24 $g/cm^3$, 1.26 $g/cm^3$, 1.28 $g/cm^3$, 1.3 $g/cm^3$, 1.32 $g/cm^3$, 1.34 $g/cm^3$, 1.36 $g/cm^3$, 1.38 $g/cm^3$ 1.4 $g/cm^3$, and a BET of, but not limited to, 4 $m^2/g$, 4.2 $m^2/g$, 4.4 $m^2/g$, 4.6 $m^2/g$, 4.8 $m^2/g$, 5 $m^2/g$, 5.2 $m^2/g$, 5.4 $m^2/g$, 5.6 $m^2/g$, 5.8 $m^2/g$, or 6 $m^2/g$.

In a preferred embodiment, the spraying is carried out under the following conditions:

the air source pressure of the spraying device is, but not limited to, 0.3 MPa, 0.4 MPa, 0.5 MPa, or 0.6 MPa;

the feeding frequency of the peristaltic pump is, but not limited to, 15 Hz, 16 Hz, 17 Hz, 18 Hz, 19 Hz, 20 Hz, 21 Hz, 22 Hz, 23 Hz, 24 Hz, 25 Hz, 26 Hz, 27 Hz, 28 Hz, 29 Hz, or 30 Hz;

the inlet air temperature is, but not limited to, 240° C., 250° C., 260° C., 270 C, 280° C., 290° C., or 300° C.; and the exhaust air temperature for spraying is, but not limited to, 100° C., 101° C., 102° C., 103° C., 104° C., 105° C., 106° C., 107° C., 108° C., 109° C., or 110° C.

In a preferred embodiment, the sintering is carried out at a high temperature of, but not limited to, 730° C., 735° C., 740° C., 745° C., 750° C., 755° C., 760° C., 765° C., or 770° C., for 15 hours to 20 hours.

A ternary material-lithium iron phosphate mixed positive electrode material, comprising a ternary material, the above lithium iron phosphate positive electrode material and a binder; where a mass ratio of the ternary material to the lithium iron phosphate positive electrode material is, but not limited to, 0.5:1, 0.6:1, 0.7:1, 0.8:1, 0.9:1, or 1:1.

Example 1

15.0 g of anhydrous ferric phosphate, 3.7 g of lithium carbonate, 1.4 g of glucose, 0.4 g of trimesic acid, 0.05 g of nano-titanium dioxide, and 0.01 g of ammonium metavanadate, were weighed and added to 40 g of deionized water, and ground to obtain a mixed solution having a D50 of 0.42 μm. The raw materials, which were uniformly mixed, were then spray dried using a spraying device at an air source pressure of 0.4 Mpa, and a peristaltic pump at a feeding frequency of 24 Hz, at an inlet air temperature of 280° C., and an exhaust air temperature of 95° C., to obtain a light yellow precursor powder; the precursor was loaded in a graphite sagger and sintered at a high temperature of 750° C. for 20 hours under the protection of nitrogen atmosphere, and then cooled naturally to obtain the spherical lithium iron phosphate positive electrode material having a high tap density.

Example 2

The method in Example 2 was basically the same as that in Example 1, except that:

The air source pressure of the spraying device was controlled at 0.5 Mpa.

Example 3

The method in Example 3 was basically the same as that in Example 1, except that:

The air source pressure of the spraying device was controlled at 0.6 Mpa.

Example 4

15.0 g of anhydrous ferric phosphate, 3.7 g of lithium carbonate, 1.4 g of glucose, 0.4 g of PEG, 0.05 g of nano-titanium dioxide, and 0.02 g of magnesium oxide, were weighed and added to 40 g of deionized water, and ground to obtain a mixed solution having a D50 of 0.46 μm. The raw materials, which were uniformly mixed, were then spray dried using a spraying device at an air source pressure of 0.4 Mpa, and a peristaltic pump at a feeding frequency of 24 Hz, at an inlet air temperature of 280° C., and an exhaust air temperature of 95° C., to obtain a light yellow precursor powder; the precursor was loaded in a graphite sagger and sintered at a high temperature of 730° C. for 20 hours under the protection of nitrogen atmosphere, and then cooled naturally to obtain the spherical lithium iron phosphate positive electrode material having a high tap density.

Example 5

The method in Example 3 was basically the same as that in Example 1, except that:

the sintering was carried out at a temperature of 750° C. for 15 hours.

Example 6

15.0 g of anhydrous ferric phosphate, 3.68 g of lithium carbonate, 1.4 g of glucose, 0.4 g of sucrose, 0.05 g of nano-titanium dioxide, and 0.02 g of zirconium dioxide, were weighed and added to 40 g of deionized water, and ground to obtain a mixed solution having a D50 of 0.44 μm. The raw materials, which were uniformly mixed, were then spray dried using a spraying device at an air source pressure of 0.4 Mpa, and a peristaltic pump at a feeding frequency of 24 Hz, at an inlet air temperature of 270° C., and an exhaust air temperature of 105° C., to obtain a light yellow precursor powder; the precursor was loaded in a graphite sagger and sintered at a high temperature of 770° C. for 20 hours under the protection of nitrogen atmosphere, and then cooled naturally to obtain the spherical lithium iron phosphate positive electrode material having a high tap density.

TABLE 1

Properties of the products in the examples

| Test items | Example 1 | Example 2 | Example 3 | Example 4 | Example 5 | Example 6 |
|---|---|---|---|---|---|---|
| Tap density (g/cm$^3$) | 1.580 | 1.51 | 1.43 | 1.45 | 1.52 | 1.55 |
| Capacity per gram at 0.1 C (mAh/g) | 161.1 | 161.6 | 160.5 | 158.6 | 157.9 | 160.5 |
| Capacity per gram at 1 C (mAh/g) | 153.9 | 152.9 | 150.2 | 147.70 | 150.55 | 154.0 |
| D50 (μm) | 9.56 | 7.62 | 5.42 | 8.13 | 7.19 | 8.13 |
| D90 (μm) | 19.22 | 15.95 | 12.88 | 17.58 | 16.51 | 17.58 |
| Dmax (μm) | 28.88 | 22.98 | 20.6 | 27.58 | 24.92 | 27.58 |

The lithium iron phosphate material prepared in Example 1 was characterized with a Japanese Rigaku X-ray powder diffractometer (XRD), and the result is shown in FIG. 1; it can be seen from FIG. 1 that the XRD spectrogram shows the characteristic peaks of lithium iron phosphate and no peaks of impurities.

Figure 2:
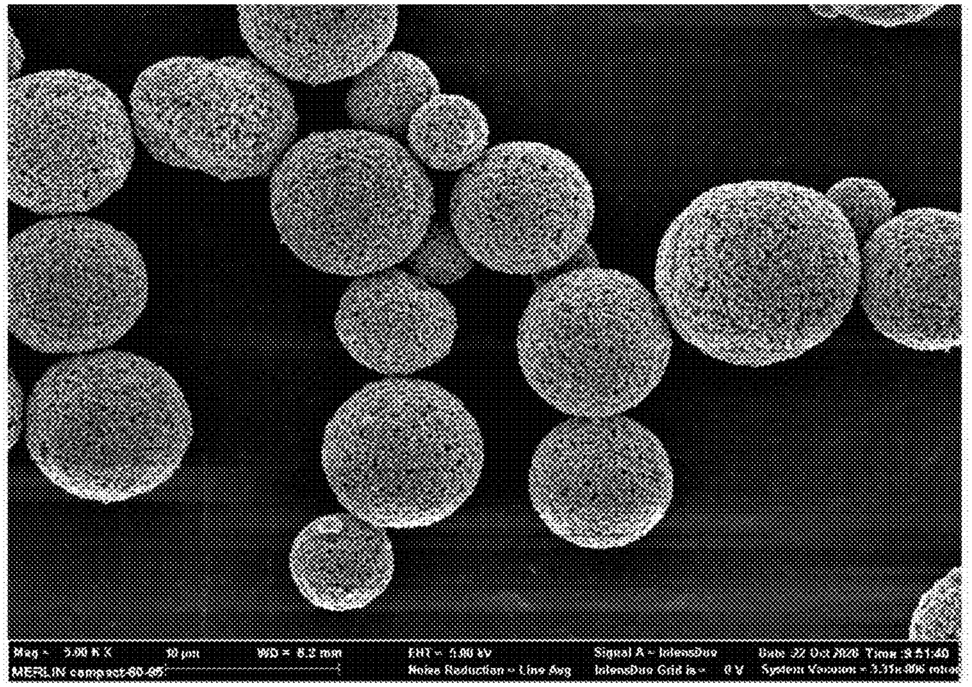
FIG. 2 is an SEM image of the lithium iron phosphate positive electrode material provided by Example 1 of the present disclosure.
Figure 3:
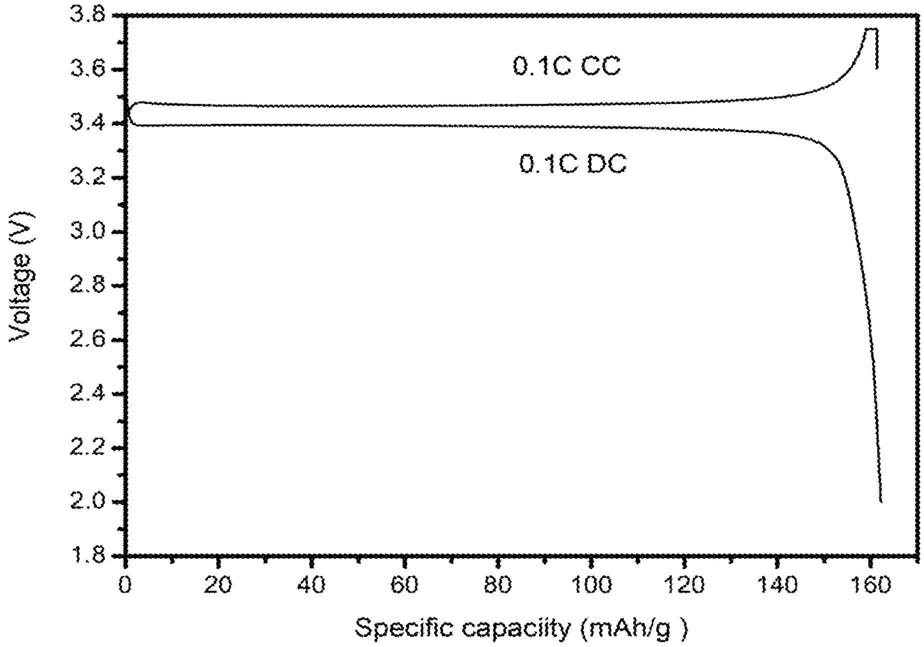
FIG. 3 is the initial charge-discharge curve of the lithium iron phosphate positive electrode material provided by Example 1 of the present disclosure at 0.1 C.
Figure 4:
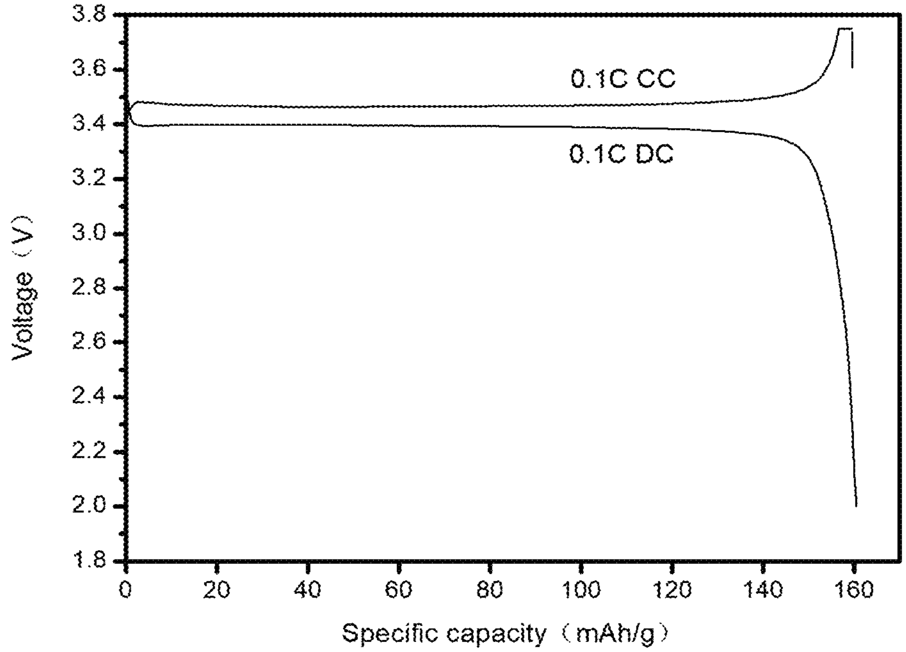
FIG. 4 is the initial charge-discharge curve of the lithium iron phosphate positive electrode material provided by Example 3 of the present disclosure at 0.1 C.
Figure 5:
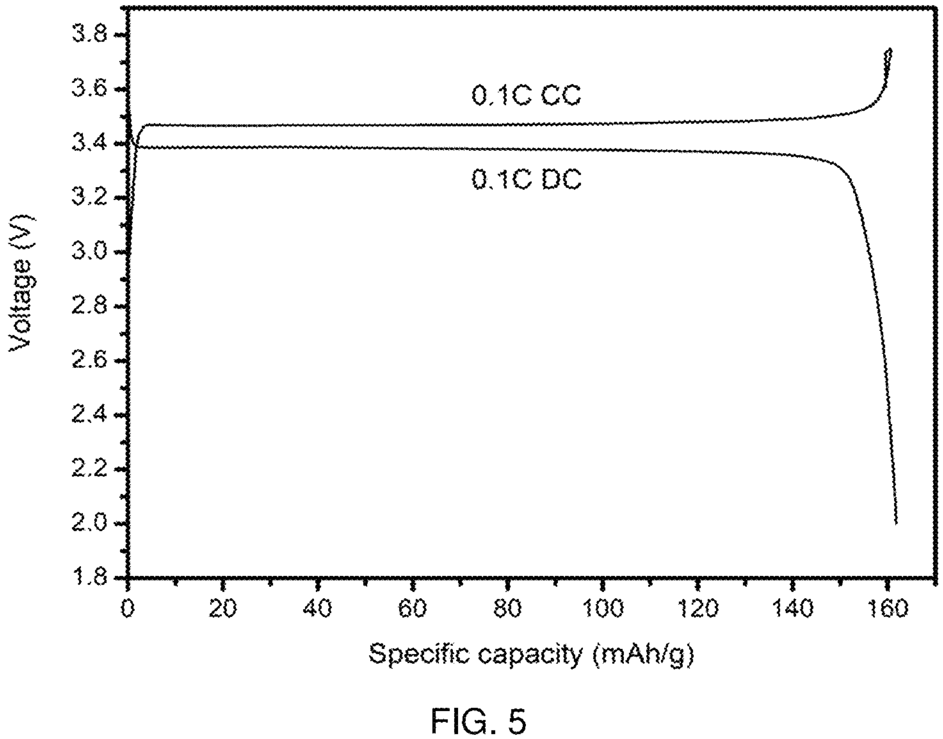
FIG. 5 is the initial charge-discharge curve of the lithium iron phosphate positive electrode material provided by Example 6 of the present disclosure at 0.1 C.
Figure 6:
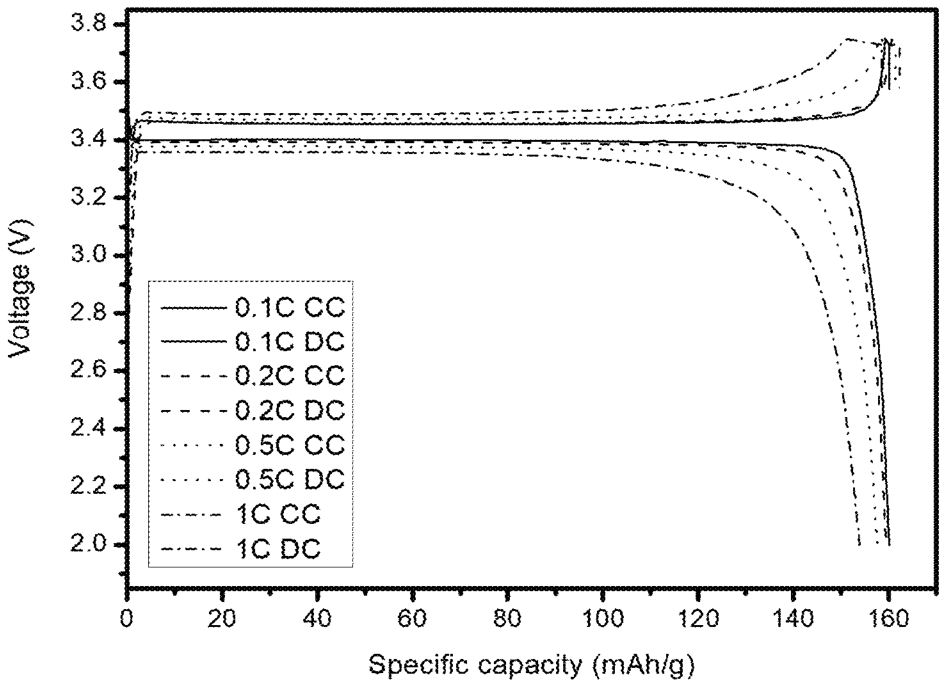
FIG. 6 is the charge-discharge curves of the lithium iron phosphate positive electrode material provided by Example 1 of the present disclosure at 0.1 C, 0.2 C, 0.5 C, and 1 C.
Figure 7:
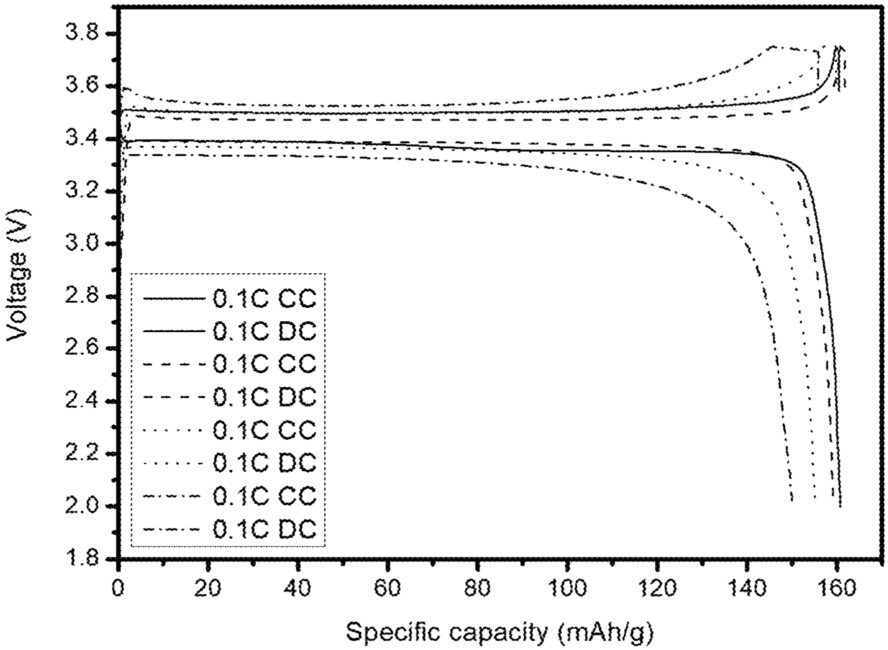
FIG. 7 is the charge-discharge curves of the lithium iron phosphate positive electrode material provided by Example 3 of the present disclosure at 0.1 C, 0.2 C, 0.5 C, and 1 C.
Figure 8:
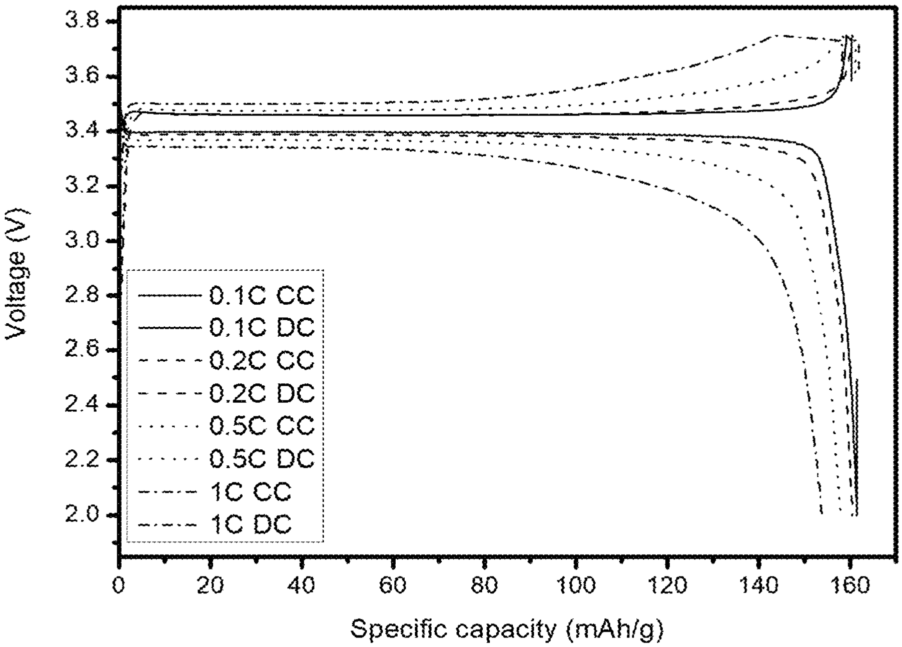
FIG. 8 is the charge-discharge curves of the lithium iron phosphate positive electrode material provided by Example 6 of the present disclosure at 0.1 C, 0.2 C, 0.5 C, and 1 C.

The lithium iron phosphate positive electrode material prepared in Example 1 was characterized by a Zeiss Sigma 500 field emission scanning electron microscope (SEM), and the results are shown in FIG. 2 which shows that the lithium iron phosphate positive electrode material prepared is in the form of large spherical particles of 3 μm to 10 μm formed by the aggregation of single crystal particles of 200 nm to 300 nm.

Experimental Examples

The lithium iron phosphate positive electrode materials prepared in Examples 1, 3, and 6 were each mixed and homogenized with conductive carbon powder and a PVDF binder in a mass ratio of 90:5:5, coated on an aluminum foil, dried at 100° C., rolled by a pair of rollers, and then made into an electrode plate having a diameter of 14 mm by a sheet-punching machine, weighed, and the mass of the active material was obtained by subtracting the mass of the aluminum foil from the total mass.

The positive electrode plate was dried and then used for the assembly of a CR2032 button half-cell in UNlab inert atmosphere glove box from Braun, Germany. The assembly was performed in the order of a negative electrode casing, a lithium plate, an electrolyte, a separator, an electrolyte, an electrode plate, a gasket, a spring, and a positive electrode casing. The electrochemical properties of the CR2032 button half-cell was tested by Wuhan LAND CT2001A battery test system at a voltage ranging from 2.0 V to 3.9 V. The test results are shown in FIG. 3, FIG. 4, FIG. 5, FIG. 6, FIG. 7, and FIG. 8.

It can be seen from FIGS. 3 to 6 that the lithium iron phosphate positive electrode material prepared in the present disclosure has a charge specific capacity of up to 162 mAh/g at 0.1 C, a discharge specific capacity of up to 160 mAh/g at 0.1 C, and the efficiency is up to 99% or more; and it has a charge specific capacity of up to 157 mAh/g at 1 C, a discharge specific capacity of up to 153 m Ah/g at 1 C, and the efficiency is up to 96%.

Although the present disclosure has been illustrated and described with specific embodiments, it should be appreciated that the above embodiments are only used to illustrate rather than to limit the technical schemes of the present disclosure. Those of ordinary skills in the art should understand that modifications may be made to the technical schemes recited in the foregoing embodiments, or equivalent substitutions may be made to a part or all of its technical features, without departing from the spirit and scope of the present disclosure; and these modifications or substitutions do not make the corresponding technical schemes essentially depart from the scope of the technical schemes of the various embodiments of the present disclosure; and therefore, all such substitutions and modifications which are within the scope of the present disclosure are intended to be encompassed in the appended claims.

What is claimed is:

1. A method for preparing a lithium iron phosphate positive electrode material having a high tap density, comprising:

grinding and spraying in sequence a mixed solution of an iron source, a lithium source, a carbon source and an ion doping agent comprising titanium dioxide to obtain a precursor powder; and sintering the precursor powder at a high temperature to obtain the lithium iron phosphate positive electrode material having a high tap density, wherein the iron source comprises anhydrous iron phosphate having a tap density of 1.2 g/cm3 to 1.4 g/cm3 and a BET of 4 m2/g to 6 m2/g; and the lithium iron phosphate positive electrode material has a spherical shape with a diameter of 3 μm to 10 μm, which is formed by aggregation of particles having a particle size of 200 nm to 300 nm.

2. The method according to claim 1, wherein a molar ratio of the iron source to the lithium source is 1:1-1.1; and the mixed solution has a solid content of 30% to 50%.

3. The method according to claim 1, wherein the lithium source comprises at least one of lithium carbonate, lithium hydroxide, lithium nitrate and lithium oxalate; and/or the carbon source comprises at least one of glucose, polyethylene glycol, trimesic acid, white granulated sugar, citric acid, sucrose, activated carbon, carbon nanotubes and graphene;

and/or the ion dopant further comprises at least one of magnesium oxide, magnesium hydroxide, zinc oxide, zirconium dioxide, vanadium pentoxide and ammonium metavanadate.

4. The method according to claim 1, wherein the mixed solution is ground to have a median particle diameter of ≤0.5 μm.

5. The method according to claim 1, wherein the spraying is carried out using a spraying device at a gas source pressure of 0.3 MPa to 0.6 MPa and a peristaltic pump at a feeding frequency of 15 Hz to 30 Hz;

the spraying is carried out at an inlet air temperature of 240° C. to 300° C. and an exhaust air temperature of 100° C. to 110° C.; and the mixed solution is sprayed to have a median particle diameter of 3 μm to 10 μm.

6. The method according to claim 1, wherein the sintering is carried out at a high temperature of 730° C. to 770° C. for a period of 15 hours to 20 hours.

7. A lithium iron phosphate positive electrode material prepared by the method according to claim 1.

8. A ternary material-lithium iron phosphate mixed positive electrode material, comprising a ternary material, the lithium iron phosphate positive electrode material according to claim 7, and a binder; and wherein, a mass ratio of the ternary material to the lithium iron phosphate positive electrode material is 0.5-1:1.

9. A lithium ion battery, comprising: a positive electrode made of the lithium iron phosphate positive electrode material according to claim 7, a negative electrode, a separator and an electrolyte.

10. A lithium ion battery, comprising: a positive electrode made of the ternary material-lithium iron phosphate mixed positive electrode material according to claim 8, a negative electrode, a separator and an electrolyte.

* * * * *